US012700925B2

(12) United States Patent (10) Patent No.: US 12,700,925 B2
Yamane et al. (45) Date of Patent: Aug. 4, 2026

(54) OPTICAL ACCESS NETWORK AND ITS DESIGN METHOD

(71) Applicant: NTT, Inc., Tokyo (JP)

(72) Inventors: Taku Yamane, Musashino (JP); Chihiro Kito, Musashino (JP); Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 172 days.

(21) Appl. No.: 18/563,451

(22) PCT Filed: May 31, 2021

(86) PCT No.: PCT/JP2021/020725
§ 371 (c)(1),
(2) Date: Nov. 22, 2023

(87) PCT Pub. No.: WO2022/254541
PCT Pub. Date: Dec. 8, 2022

(65) Prior Publication Data
US 2024/0259099 A1 Aug. 1, 2024

(51) Int. Cl.
*H04B 10/00* (2013.01)
*H04B 10/275* (2013.01)
*H04J 14/00* (2006.01)

(52) U.S. Cl.
CPC ................................. *H04B 10/275* (2013.01)

(58) Field of Classification Search
CPC ............ H04B 10/25755; H04B 10/275; H04B 10/2755; H04J 2203/0042; H04J 14/0283
See application file for complete search history.

(56) References Cited

U.S. PATENT DOCUMENTS

2001/0017722 A1* 8/2001 Takachio ........... H04Q 11/0062
                                                        398/79
2013/0084067 A1 4/2013 Iwamura

FOREIGN PATENT DOCUMENTS

JP           201377891           4/2013

OTHER PUBLICATIONS

[No Author Listed], "White Paper 5G Evolution and 6G," NTT Docomo, Inc., Jul. 2020, 65 pages (with English translation).
Ohno et al., "Optical Access Network Design for Beyond 5G," NTT, 4 pages (with English translation).
Takasugi et al., "Optical Access Network Design for the Initial Stage of FTTH," IEICE Technical Report, Feb. 1998, 10 pages (with English translation).

* cited by examiner

*Primary Examiner* — Daniel G Dobson
(74) *Attorney, Agent, or Firm* — Fish & Richardson P.C.

(57) ABSTRACT
The present disclosure provides an optical access network and a method for designing the same, in which a plurality of optical cable loops, in which optical cables are connected in a loop shape, are disposed between a communication station building and an optical termination position, and the optical cable loops are connected to each other.

7 Claims, 10 Drawing Sheets

OPTICAL PATH LENGTH TO CUSTOMER
INSTALLATION PLACE = a + b+ 2c+ d+ e

OPTICAL PATH LENGTH TO CUSTOMER
INSTALLATION PLACE = a + b+ 2c+ d+ e

OPTICAL PATH LENGTH TO CUSTOMER INSTALLATION PLACE = a + b + d+ e

REQUIRED NUMBER OF OPTICAL FIBERS
$M_a + \sqrt{M_a}$

LOWER LOOP WITH
UNIFORM PERIMETERS

REQUIRED NUMBER OF OPTICAL FIBERS
$M_m + M_a + \sqrt{M_m} + \sqrt{M_a}$

UPPER LOOP WITH
UNIFORM PERIMETERS

REQUIRED NUMBER OF OPTICAL FIBERS
$M_m + \sqrt{M_m} + M_a + \sqrt{M_a}$

REQUIRED NUMBER OF OPTICAL FIBERS
$M_a + \sqrt{M_a}$

LOWER LOOP WITH
UNIFORM PERIMETERS

NUMBER CORRESPONDING TO BOTH
UPPER AND LOWER CABLES, OR
REQUIRED NUMBER OF OPTICAL FIBERS
FOR UPPER/LOWER INTEGRATED CABLE
$M_m + M_a + \sqrt{(M_m + M_a)}$

UPPER LOOP WITH
UNIFORM PERIMETERS

REQUIRED NUMBER OF OPTICAL FIBERS
$M_m + \sqrt{M_m} + M_a + \sqrt{M_a}$

OPTICAL ACCESS NETWORK AND ITS DESIGN METHOD

CROSS-REFERENCE TO RELATED APPLICATIONS

This application is a National Stage application under 35 U.S.C. § 371 of International Application No. PCT/JP2021/020725, having an International Filing Date of May 31, 2021, the disclosure of which is considered part of the disclosure of this application, and is incorporated by reference in its entirety into this application.

TECHNICAL FIELD

The present disclosure relates to a field of design techniques of optical fiber cable network configurations in access-based communication networks.

BACKGROUND ART

In a star-type optical access network widely spread for fiber to the home (FTTH), even one disconnection point of an optical fiber interrupts communication service, and therefore makes it difficult to utilize the network for a high reliability connection service. Further, in the conventional facility development of FTTH, the required number of optical fibers could be predicted from past trends in the FTTH utilization rate with the number of households as a parameter, but the future optical fiber demand is mainly from a radio communication company that installs radio antennas, and makes it extremely difficult to predict the installation positions and the installation number of radio antennas depending on the strategy of each company. For this reason, in the conventional star type optical access network, in which economical FTTH development has been realized by fixedly connecting a communication station building and a predicted demand occurrence point, when it is difficult to predict the demand occurrence point and volume, situations such as exhaustion of facility resources, thereby forcing addition of facilities, or excess of optical fiber resources are expected.

On the other hand, with a loop type fiber distribution, even when demand fluctuation occurs, it is easier to avoid situations such as exhaustion of facility resources, thereby forcing addition of facilities, or excess of optical fiber resources. Further, the loop type fiber distribution makes it possible to employ a differently routed redundant configuration in which two or more optical fibers are made to be different routes sharing a common point by fiber distribution. However, when the accommodation area of the communication station building is covered with a single loop, the diameter of the loop is large and a single failure section of the optical cable is long in fiber distribution into the loop. Accordingly, it is conceivable that the number of failures in time (FITs) proportional to the length of the single failure section will increase and the failure rate will increase.

CITATION LIST

Non Patent Literature

[NPL 1] White Paper 5G evolution and 6G, NTT DoCoMo, July 2020

[NPL 2] Takasugi et al., "Optical Access Network Design for the Initial Stage of FTTH," IEICE Technical Report, SSE97-176, OCS97-105, February 1998

SUMMARY OF INVENTION

Technical Problem

An object of the present disclosure is to achieve a shortened single failure section length and a reduced failure rate relative to those of a single loop type fiber distribution.

Solution to Problem

The present disclosure provides a concatenated loop type optical access network configuration in which a plurality of optical cable loops are disposed in an accommodation area of a communication station building so that each loop (optical cable loop) formed by looping an optical cable does not become too large, and in which two or more optical cable loops are connected to each other, thereby covering the accommodation area of the communication station building.

Specifically, an optical access network of the present disclosure is an optical access network that connects a communication station building and an optical termination position by optical cables, the optical access network including:

a plurality of optical cable loops, in which the optical cables are connected in a loop shape, in which the optical cable loops are connected to each other.

Specifically, a method for designing an optical access network of the present disclosure includes:

disposing a plurality of optical cable loops, in which optical cables are connected in a loop shape, between a communication station building and an optical termination position; and connecting the optical cable loops to each other.

Advantageous Effects of Invention

According to the present disclosure, since an optical access network connecting a communication station building and an optical termination position by optical fibers is formed as a concatenated loop type fiber distribution, it is practicable to achieve a shortened single failure section length and a reduced failure rate relative to those of a single loop type fiber distribution.

BRIEF DESCRIPTION OF DRAWINGS

FIG. 9 illustrates an example of calculation of the required number of optical fibers in loops that have no common route passed through.

FIG. 10 illustrates an example of calculation of the required number of optical fibers in loops that have a common route passed through.

DESCRIPTION OF EMBODIMENTS

Figure 1:
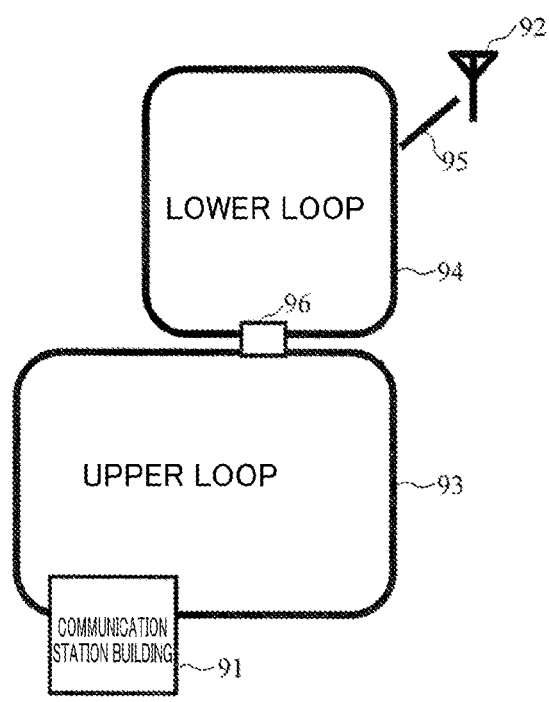
FIG. 1 illustrates an example of a basic network configuration.

Embodiments of the present disclosure will be described hereinafter in detail with reference to the drawings. It is to be understood that the present disclosure is not limited to the embodiments described below. The embodiments are merely exemplary and the present disclosure can be implemented in various modified and improved modes based on knowledge of those skilled in the art. The same reference sign of constituent elements in the present specification and in the drawings represents the same constituent elements.

FIG. 1 illustrates an example of a basic network configuration of the present disclosure. The optical access network of the present disclosure is an optical access network connecting a communication station building 91 to a customer installation place 92, which is an optical termination position, by optical cables. In the method for designing an optical access network of the present disclosure, a plurality of optical cable loops are disposed in an accommodation area managed by the communication station building 91 so that each loop (optical cable loop) composed of one of the optical cables does not become too large, and two or more optical cable loops are connected to each other. Thus, the optical access network of the present disclosure has a concatenated loop type optical access network configuration covering the accommodation area of the communication station building 91.

Regarding size, each of the optical cable loops is set to have a single failure section length making a failure rate or the number of FITs lower than the target failure rate or the target number of FITs by referring to the failure rate or the number of FITs which is different depending on a type of optical cable of the optical cable connected in a loop shape and a construction environment. FIG. 1 illustrates an example in which two optical cable loops are provided as a plurality of optical cable loops. Hereinafter, in the concatenated loop, the optical cable loop connected to the communication station building 91 is referred to as an "upper loop," and the optical cable loop not connected to the communication station building 91 but connected to the upper loop is referred to as a "lower loop."

The upper loop cable 93 is an optical cable constituting the upper loop, and is connected to the communication station building 91. The lower loop cable 94 is an optical cable constituting the lower loop, and is tied to the customer installation place 92 with a fiber distribution cable 95.

Figure 2:
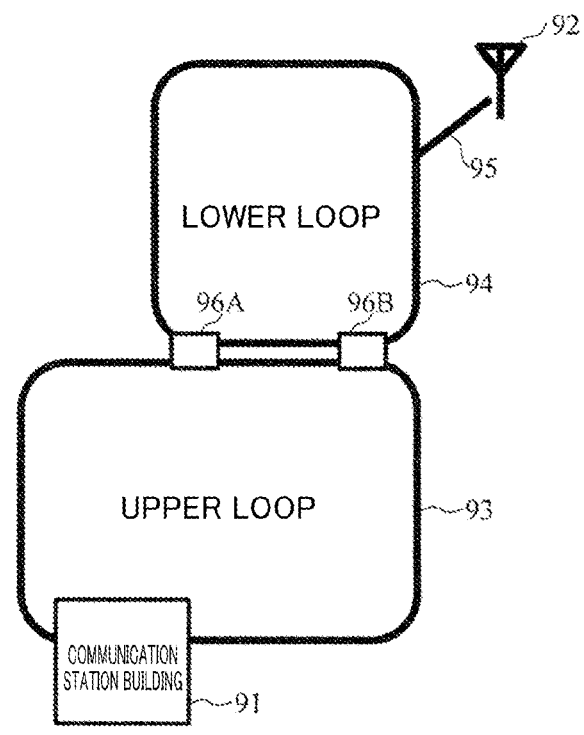
FIG. 2 illustrates an example of a network configuration of the present disclosure.

FIG. 2 illustrates an example of a network configuration of the present disclosure. In the method for designing an optical access network of the present disclosure, an upper loop and a lower loop are disposed between the communication station building 91 and the customer installation place 92, and these optical cable loops are connected to each other. In this example, the connection is made in accordance with the following policy.

The upper loop and the lower loop are designed to pass through the common route as much as possible.

Two or more connection points are provided on the common route between the upper loop and the lower loop.

Figure 3:
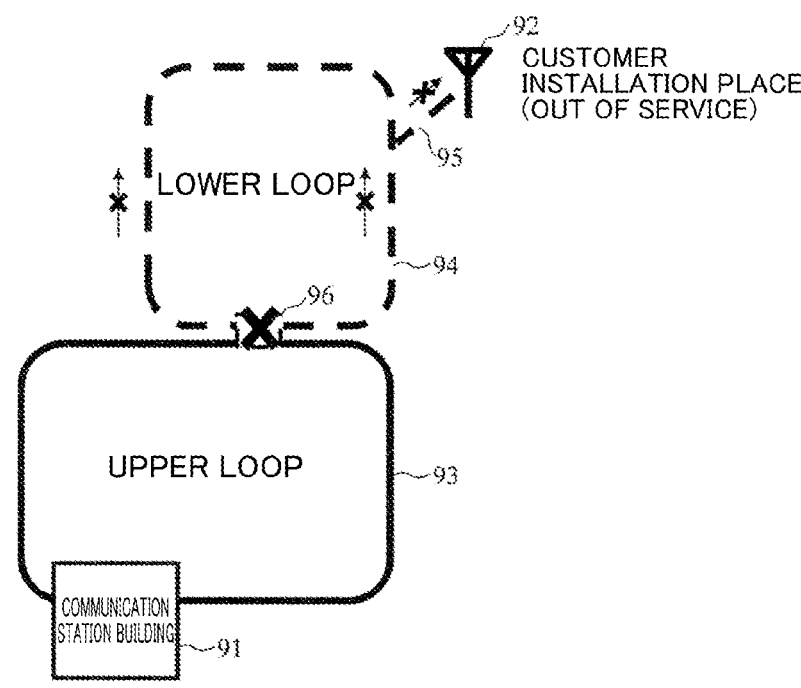
FIG. 3 illustrates the effect of failures on an upper loop and a lower loop where there is one connection point.
Figure 4:
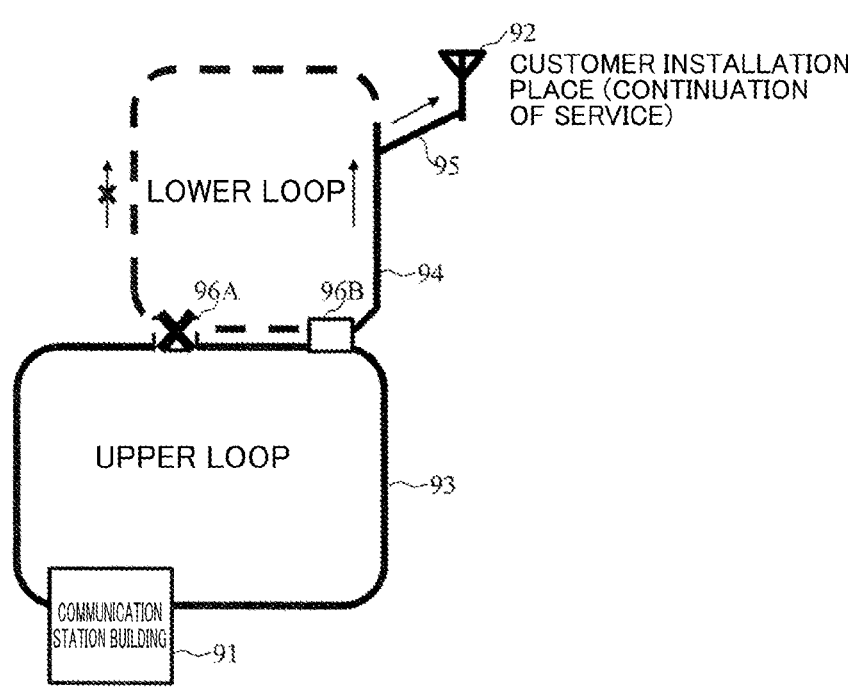
FIG. 4 illustrates the effect of failures on an upper loop and a lower loop where there are two connection points.

With reference to FIGS. 3 and 4, the improvement of reliability by providing two connection points on the common route between the upper loop and the lower loop will be described.

When there is one connection point, as illustrated in FIG. 3, failure of a connection point 96 makes the entire lower loop disconnected.

On the other hand, when there are two connection points, as illustrated in FIG. 4, it is possible to take a measure for avoiding one of high-risk areas on the hazard map by virtue of the two connection points. Therefore, the probability of simultaneously suffering damage to both connection points 96A and 96B can be reduced, and the occurrence of a single failure point can be avoided, thereby improving reliability. When a failure occurs at one connection point 96A, communication service can be continued via the other connection point 96B.

Figure 5:
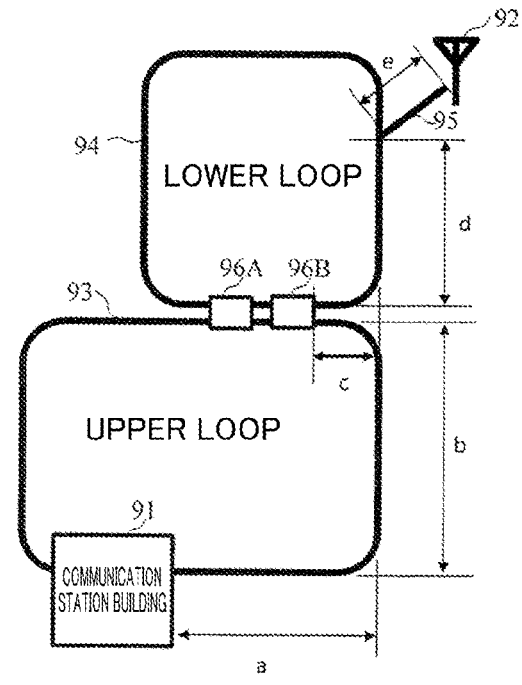
FIG. 5 illustrates an example of optical path lengths where the connection points, on a common route between the upper loop and the lower loop, are disposed close to each other.
Figure 6:
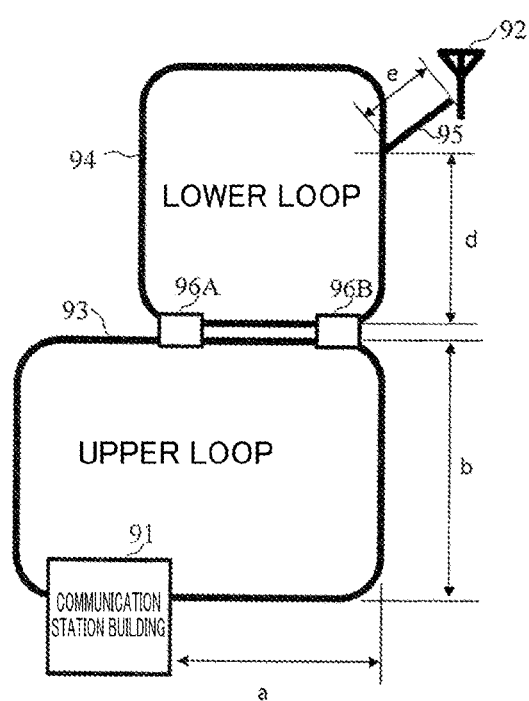
FIG. 6 illustrates an example of optical path lengths where the connection points, on the common route between the upper loop and the lower loop, are disposed away from each other.

With reference to FIGS. 5 and 6, the distances between the connection points 96A and 96B are compared.

In FIG. 5, the connection points on the common route between the upper loop and the lower loop are disposed close to each other. In this configuration, the optical path length from the communication station building 91 to the customer installation place 92 via the connection point 96B is a+b+2c+d+e. On the other hand, in FIG. 6, the connection points on the common route between the upper loop and the lower loop are disposed away from each other. In this configuration, the optical path length from the communication station building 91 to the customer installation place 92 via the connection point 96B is a+b+d+e.

Thus, in the present embodiment, on the common route between the upper loop and the lower loop, the distance between the two connection points is widened within an allowable range on the common route. By increasing the distance between the connection points, the optical path length connecting a certain point on the upper loop and a certain point on the lower loop is shortened, so that the delay from the communication station building 91 to the customer installation place 92 is reduced. Further, since the optical path length from the communication station building 91 to the customer installation place 92 is shortened, the optical loss is reduced.

Figure 7:
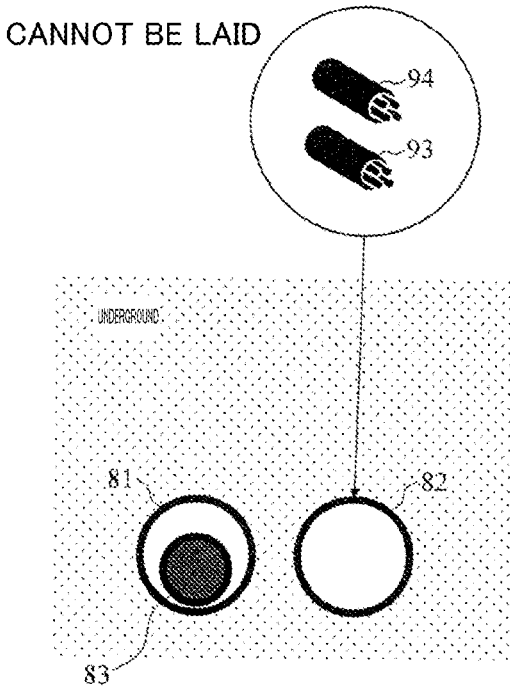
FIG. 7 illustrates an example of cable laying where cables are not integrated.
Figure 8:
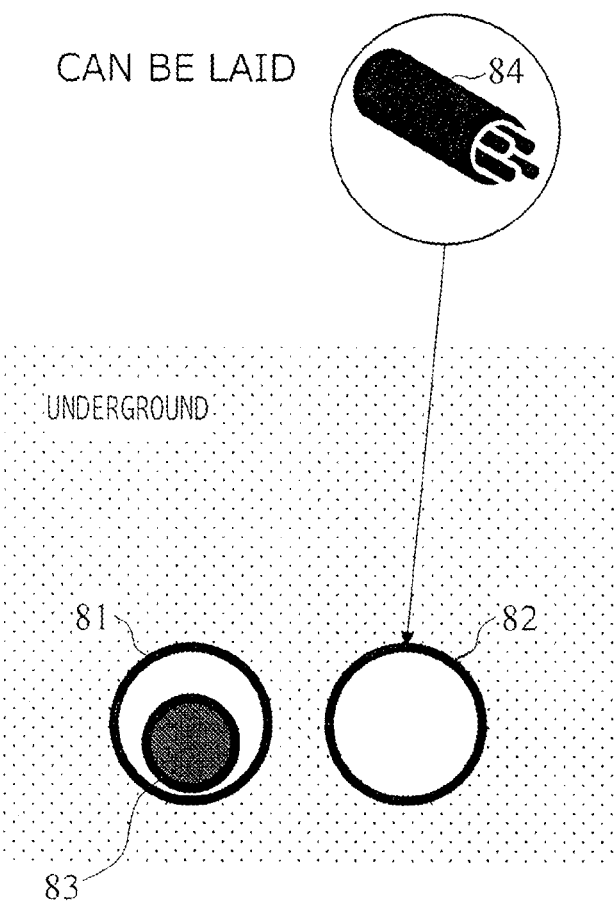
FIG. 8 illustrates an example of cable laying where cables are integrated.

With reference to FIGS. 7 and 8, integration of laid cables between the connection points 96A and 96B will be described. When the vacant conduit is one main conduit 82 only and the main conduit 82 does not allow two cables to be laid therein, both the upper loop cable 93 and the lower loop cable 94 cannot be laid as illustrated in FIG. 7.

On the other hand, in the present disclosure, as illustrated in FIG. 8, a cable to be laid between the connection points 96A and 96B is laid as an integrated loop cable 84 obtained by integrating two cables, i.e., the upper loop cable 93 and the lower loop cable 94, into one line. Thus, in the present embodiment, even when the vacant conduit is one main conduit 82 only and the main conduit 82 does not allow two cables to be laid therein, the connection points 96A and 96B can be connected.

In the method for designing an optical access network of the present disclosure, an upper loop and a lower loop are disposed between the communication station building 91 and the customer installation place 92, and these optical cable loops are connected to each other. In this disposition, the connection is made in accordance with the following policy.

In the loop cables laid between two connection points 96A and 96B on the common route between the upper loop and the lower loop, the number of cores of the integrated cable is reduced so as to achieve the same probability of increase, per fixed width of demand fluctuation, as that of the loops having no common route passed through.

For example, the loop cables laid between two connection points 96A and 96B on the common route between the upper loop and the lower loop may be integrated into one line (hereinafter referred to as an integrated loop cable).

The two connection points 96A and 96B on the common route between the upper loop and the lower loop are integrated into one integrated loop cable 84, and the number of cores of the integrated cable is reduced so as to achieve the same probability of increase, per fixed width of demand fluctuation, as that of state prior to the integration.

Figure 9:
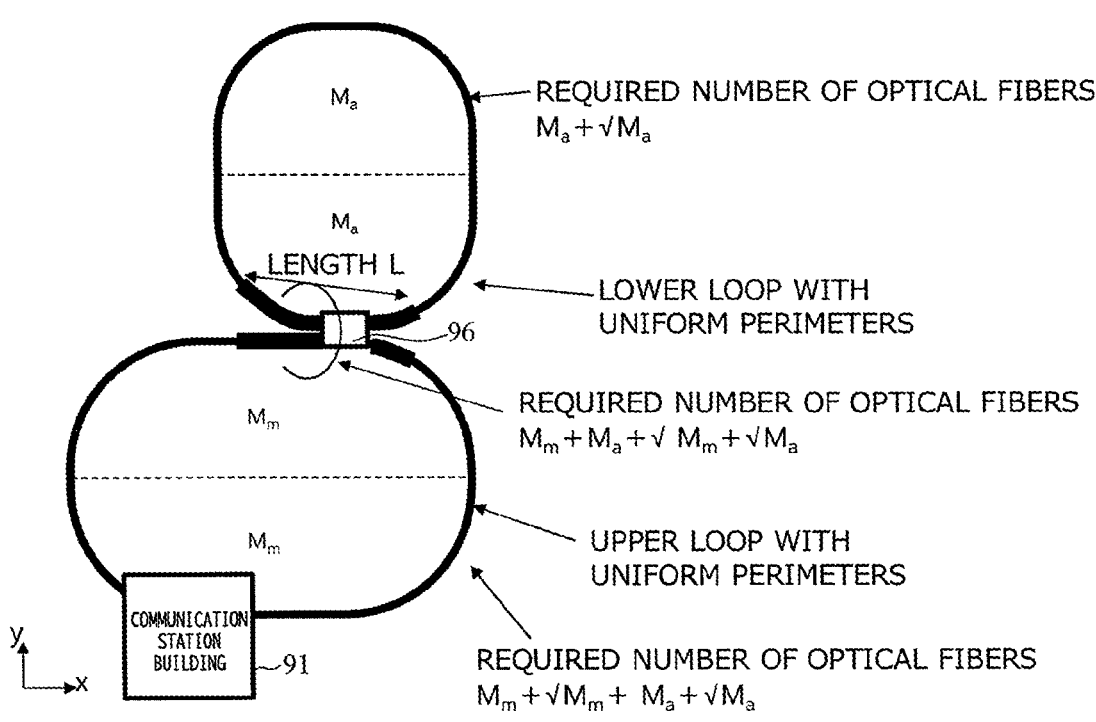
Figure 10:
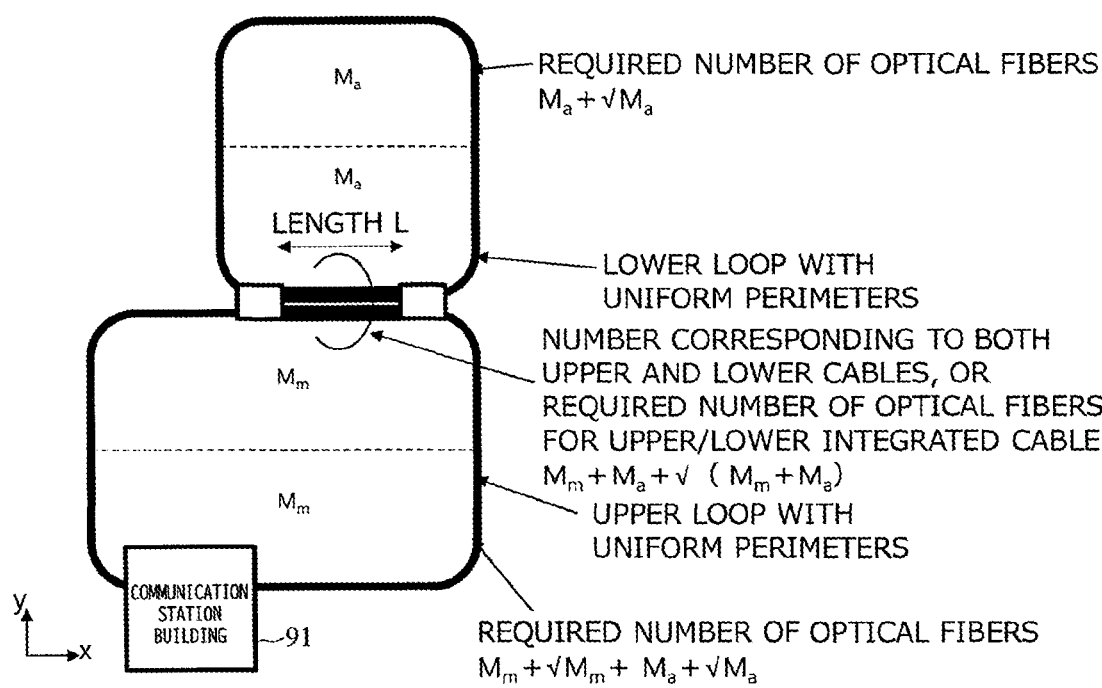

With reference to FIGS. 9 and 10, the effect of improving the optical fiber flexibility between the connection points 96A and 96B will be described. In FIGS. 9 and 10, for simplicity, it is assumed that the demands for the upper half of the upper loop and the lower half of the lower loop are accommodated in a route extending in the x-axis direction. Assuming that the probability density function of demand generation follows the Poisson process, it is conceivable to build facilities by increasing the number of optical fibers by √M corresponding to the width of demand fluctuation with respect to the estimated number of demand M. Both numbers of demands in the upper and lower halves of the lower loop are equivalent to $M_a$, and Both numbers of demands in the upper and lower halves of the upper loop are equivalent to $M_m$. In light of the above, the required number of optical fibers in the lower loop is given by the following expression.

[Math. 1]

$$M_a + \sqrt{M_a} \qquad \text{(Expression 1)}$$

The required number of optical fibers in the upper loop is given by the following expression.

[Math. 2]

$$M_m + \sqrt{M_m} + M_a + \sqrt{M_a} \qquad \text{(Expression 2)}$$

In the loops having no common route passed through illustrated in FIG. 9, it is necessary to increase the number of each of the upper loop cable 93 and the lower loop cable 94 by √M corresponding to the width of demand fluctuation. Therefore, the required number of optical fibers at the connection point 96 is given by the following expression.

[Math. 3]

$$M_m + M_a + \sqrt{M_m} + \sqrt{M_a} \qquad \text{(Expression 3)}$$

In the loops having no common route passed through illustrated in FIG. 10, the required number of optical fibers of the integrated loop cable 84 having the common route passed through may be given by the following expression.

[Math. 4]

$$M_m + M_a + \sqrt{M_m + M_a} \qquad \text{(Expression 4)}$$

Therefore, when loops are constructed to have the common route passed through, the fluctuation width for the demand accommodated in the same section is compressed by virtue of the swarming effect. Thereby, the number of optical fibers required for the common route section can be less than that of the equivalent section having no common route passed through.

Effect of Present Disclosure

By forming a concatenated loop having an upper loop and a lower loop, a shortened single failure section length and a reduced failure rate, relative to those of a single loop fiber distribution, can be achieved. Here, the above-described embodiment shows an example in which the concatenated loop is a double loop, but any n-tuple loop where n represents an integer equal to or more than two can be employed.

By providing two connection points for adjacent loops in the concatenated loop, compared to a concatenated loop with one connection point, it is possible to take a measure for avoiding one of high-risk areas on the hazard map, and to reduce the probability of simultaneously suffering damage to both of the connection points, thereby improving the reliability.

By widening the distance between the connection points 96A and 96B, the optical path length connecting a certain point on the upper loop and a certain point on the lower loop is shortened, so that the delay is reduced.

By widening the distance between the connection points 96A and 96B, the optical path length from the communication station building 91 to the customer installation place 92 is shortened, so that the optical loss is reduced.

By integrating the loop cables laid between the two connection points 96A and 96B on the common route between the upper loop and the lower loop into one line, the laying process and the material cost are reduced, so that the construction cost is reduced.

By integrating the loop cables laid between the two connection points 96A and 96B on the common route between the upper loop and the lower loop into one line, the number of conduits to be used is reduced, so that the conduit resources can be saved.

By laying the upper loop and the lower loop on the common route, it is possible to reduce the probability of increase, even when demand fluctuates, by virtue of the swarming effect. This is because, in response to the optical fiber demand generated in the upper loop (or the lower loop), it is possible to absorb demand fluctuations in the upper loop (or the lower loop) and accommodate demand by accommodating the optical fiber resources originally set in the lower loop (or the upper loop). In other words, in laying the upper loop and the lower loop on the common route, the required number of cores (and the total length of optical fibers) can be less than that (those) of an optical access network, configured to ensure the same tolerance to demand fluctuations, having a section where the upper loop and lower loop meet is short (or having only one connection point).

INDUSTRIAL APPLICABILITY

In recent years, in 5G, where base station development is progressing, its importance as a social infrastructure that supports industrial development and society is expected to increase in the future. Furthermore, in the beyond 5G/6G era, further evolution of the three characteristic functions of 5G (large capacity, high reliability/low delay, and multiple simultaneous connections) is expected. [NPL 1]

Since future optical access network equipment, including a mobile fronthaul, will be the communication infrastructure equipment that supports all information and communication services, in the Beyond 5G era, there is a demand for a method for designing an optical access network that satisfies the above diverse and advanced characteristic functions in a single fiber distribution configuration. In optical access networks that connect communication devices, it is considered that mission critical high reliability connection (reliability) and flexibility in opening an optical fiber used in a mobile fronthaul are important, especially, as functional requirements for the optical access network in the Beyond 5G/6G era.

In addition, when laying a new optical cable for the Beyond 5G/6G era, it is desirable to lay it in an underground section in order to ensure higher reliability. However, since the main conduits, which are underground communication infrastructure facilities, receive metal cables and optical cables, there are few vacant conduits.

Since the present disclosure has the above configuration and effects, a single failure section length can be shortened and a failure rate can be reduced. Therefore, it can support the development of 5G base stations and the laying of optical cables for the Beyond 5G/6G era.

REFERENCE SIGNS LIST

81, 82 Main conduit
83 Existing cable
91 Communication station building
92 Customer installation place
93 Upper loop cable
94 Lower loop cable
95 Fiber distribution cable
96, 96A, 96B Connection point

The invention claimed is:

1. An optical access network that connects a communication station building and an optical termination position by optical cables, the optical access network comprising:
   a plurality of optical cable loops, in which the optical cables are connected in a loop shape, wherein:
      the optical cable loops are connected to each other;
      the optical cable loops connected to each other have two connection points laid on a common route; and
      an optical cable, laid on the common route to the other optical cable loops of the optical cable loops, is composed of an integrated loop cable obtained by integrating a plurality of optical cable loops.

2. A method for designing an optical access network, the method comprising:
   disposing a plurality of optical cable loops, in which optical cables are connected in a loop shape, between a communication station building and an optical termination position; and connecting the optical cable loops to each other, wherein each of the optical cable loops has a length that is a single failure section length making a failure rate or the number of failure in times (FITs) less than a determined value based on an optical cable type or a construction environment.

3. The method for designing an optical access network according to claim 2, further comprising:
   providing, on a common route, two connection points between the optical cable loops, in a section where the plurality of optical cable loops are laid on the common route; and
   reducing the number of cores of at least one of two or more cables laid on the common route so that the same probability of increase is achieved, per fixed width of demand fluctuation, as that of the optical cable loops not laid on the common route.

4. The method for designing an optical access network according to claim 2, further comprising:
   providing, on a common route, two connection points between the optical cable loops, in a section where the plurality of optical cable loops are laid on the common route; and
   reducing the number of cores of two or more cables laid on the common route so that the same probability of increase is achieved, per fixed width of demand fluctuation, as that of state prior to integration.

5. A method for designing an optical access network comprising:
   disposing a plurality of optical cable loops, in which optical cables are connected in a loop shape, between a communication station building and an optical termination position; and
   connecting the optical cable loops to each other, including:
      providing, on a common route, two connection points between the optical cable loops, in a section where the plurality of optical cable loops are laid on the common route; and
      widening a distance between the two connection points provided on the common route, within an allowable range on the common route.

6. The method for designing an optical access network according to claim 5, further comprising:
   providing, on a common route, two connection points between the optical cable loops, in a section where the plurality of optical cable loops are laid on the common route; and
   reducing the number of cores of at least one of two or more cables laid on the common route so that the same probability of increase is achieved, per fixed width of demand fluctuation, as that of the optical cable loops not laid on the common route.

7. The method for designing an optical access network according to claim 5, further comprising:
   providing, on a common route, two connection points between the optical cable loops, in a section where the plurality of optical cable loops are laid on the common route; and
   reducing the number of cores of two or more cables laid on the common route so that the same probability of increase is achieved, per fixed width of demand fluctuation, as that of state prior to integration.

* * * * *